United States Patent
Kelley (10) Patent No.: US 11,495,060 B1
(45) Date of Patent: Nov. 8, 2022

(54) SYSTEM AND METHOD FOR TRACKING VEHICLE TOLL TRANSPONDER USE BY TRANSIENT USERS

(71) Applicant: CENTRAL FLORIDA EXPRESSWAY AUTHORITY, Orlando, FL (US)

(72) Inventor: Laura Kelley, Orlando, FL (US)

(73) Assignee: Central Florida Expressway Authority, Orlando, FL (US)

(*) Notice: Subject to any disclaimer, the term of this patent is extended or adjusted under 35 U.S.C. 154(b) by 153 days.

(21) Appl. No.: 16/781,437

(22) Filed: Feb. 4, 2020

Related U.S. Application Data (63) Continuation-in-part of application No. 16/657,462, filed on Oct. 18, 2019, now abandoned.

(60) Provisional application No. 62/747,457, filed on Oct. 18, 2018.

(51) Int. Cl.
| | |
|---|---|
| *G08G 1/065* | (2006.01) |
| *G07B 15/06* | (2011.01) |
| *G06Q 20/40* | (2012.01) |
| *G06Q 20/14* | (2012.01) |
| *G06Q 30/02* | (2012.01) |

(52) U.S. Cl.
CPC ......... *G07B 15/063* (2013.01); *G06Q 20/145* (2013.01); *G06Q 20/4014* (2013.01); *G06Q 30/0284* (2013.01)

(58) Field of Classification Search
CPC .............. G07B 15/063; G06Q 20/145; G06Q 20/4014; G06Q 30/0284
USPC .......................................................... 340/928
See application file for complete search history.

(56) References Cited

U.S. PATENT DOCUMENTS

| | | | |
|---|---|---|---|
| 9,911,245 B1* | 3/2018 | Geist ..................... | G07B 15/063 |
| 2007/0285280 A1* | 12/2007 | Robinson ............. | G07B 15/063 340/928 |
| 2007/0299721 A1* | 12/2007 | Robinson ............. | G06Q 20/102 705/13 |
| 2014/0307923 A1* | 10/2014 | Johansson ............... | G06V 20/62 382/105 |
| 2015/0049914 A1* | 2/2015 | Alves ..................... | G06V 20/63 382/105 |
| 2018/0025551 A1* | 1/2018 | Centner ............. | G06K 7/10297 705/13 |
| 2019/0066492 A1* | 2/2019 | Nijhuis .................. | G08G 1/054 |

* cited by examiner

*Primary Examiner* — Naomi J Small
(74) *Attorney, Agent, or Firm* — Allen, Dyer, Doppelt & Gilchrist, P.A.

(57) ABSTRACT

A system and method associate a transponder identifier with a transient user account. The account is automatically activated and vehicle license plate information from the transient user's vehicle is automatically associated upon departure of the transient user from a vehicle departure point of a transportation hub. Toll charges incurred by the vehicle can then be associated with the transient user's account based on either reading the transponder identifier or capturing the license plate information. The account is automatically deactivated and closed-out upon return of the vehicle to a vehicle return point at the end of the transient use.

19 Claims, 12 Drawing Sheets

SYSTEM AND METHOD FOR TRACKING VEHICLE TOLL TRANSPONDER USE BY TRANSIENT USERS

CROSS REFERENCE TO RELATED APPLICATIONS

This application is a continuation-in-part of U.S. application Ser. No. 16/657,462 filed on Oct. 18, 2019, which claims the benefit of U.S. Provisional Application Ser. No. 62/747,457 filed on Oct. 18, 2018, the contents of which applications are herein incorporated by reference in their entirety.

FIELD OF THE INVENTION

The present invention relates to systems and methods for facilitating electronic toll payments, and more particularly, to system for facilitating electronic payments for transient users.

BACKGROUND OF THE INVENTION

Many popular business and leisure travel destinations feature toll roads in and around travel hubs, such as airports and railroad stations. While electronic transponders have been used for quite some time to facilitate electronic toll payments for drivers, most rental vehicles are not typically equipped with transponders for various practical and technical reasons. For instance, most toll systems using transponders for electronic toll payment associate a unique transponder identification (ID) with a particular vehicle in their database. Consequently, if a transponder is not successfully read at a toll plaza, the vehicle can be—typically via license plate scanning—automatically correlated to its assigned transponder ID and proper billing for the toll will still occur in a manner largely transparent to the user. The importance of this database association between transponder IDs and vehicles is even more important where, as is increasingly common, multiple independent toll authorities will accept each other's transponders and automatically inter-communicate tolls incurred electronically. Many rental car companies, having very large fleets, are generally unwilling to incur the costs associated with equipping each of their vehicles with a dedicated transponder.

Hence, transient users of toll roads driving rental cars are usually faced with a choice between manually paying each required toll or utilizing very expensive toll payment services offered by some rental agencies. Such toll payment services usually involve the user simply not paying the toll and having the vehicle assessed for non-payment by the toll authority based on license plate scanning at toll plazas. The bill for non-payment eventually makes it way to the toll payment service provider, which then pays whatever tolls (and other fees or charges) were incurred by the user. This process may take a considerable amount of time after the user's trip to be completed, hence making it difficult or impossible to quickly and automatically assess toll payments contemporaneously with a user's travel. Consequently, the user is simply required to pay a very high daily fee for the convenience of the service, which the toll service provider estimates will be high enough to cover all likely toll payments and its profit.

SUMMARY OF THE INVENTION

In view of the foregoing, it is an object of the present invention to provide a system and method for facilitating electronic payments for transient users. In one embodiment of the present invention, a server is configured with program instructions to receive account information for a transient user account, which includes at least a unique transient user identifier and an associated unique transponder identifier. The server is further configured to update the account information to include the unique transponder identifier associated with the unique transient user identifier and to indicate an account status as active. Additionally, the server is configured to receive initial departure information including a vehicle license plate number and issuing authority, and to update the account information to include the vehicle license plate number and issuing authority.

When the server subsequently receives toll usage information indicating incurrence of a toll charge at a specified charge time and date associated with at least one of the unique transponder identifier; and the vehicle license plate number and issuing authority, the server is configured to update the account information to include the toll charge based on the toll usage information if the account information indicates the account status as active at the specified charge time and date.

According to an aspect of the present invention, receiving the initial departure information includes receiving an initial departure communication from a sensor unit at a vehicle departure point, the initial departure communication including the unique transponder identifier and vehicle license plate data.

According to another aspect of the present invention, the server is configured to receive initial return information including the unique transponder identifier included in the account information, and determine whether to update the account information to indicate the account status as inactive.

These and other objects, aspects and advantages of the present invention will be better understood in view of the drawings and following detailed description of preferred embodiments.

DETAILED DESCRIPTION OF PREFERRED EMBODIMENTS

Figure 1:
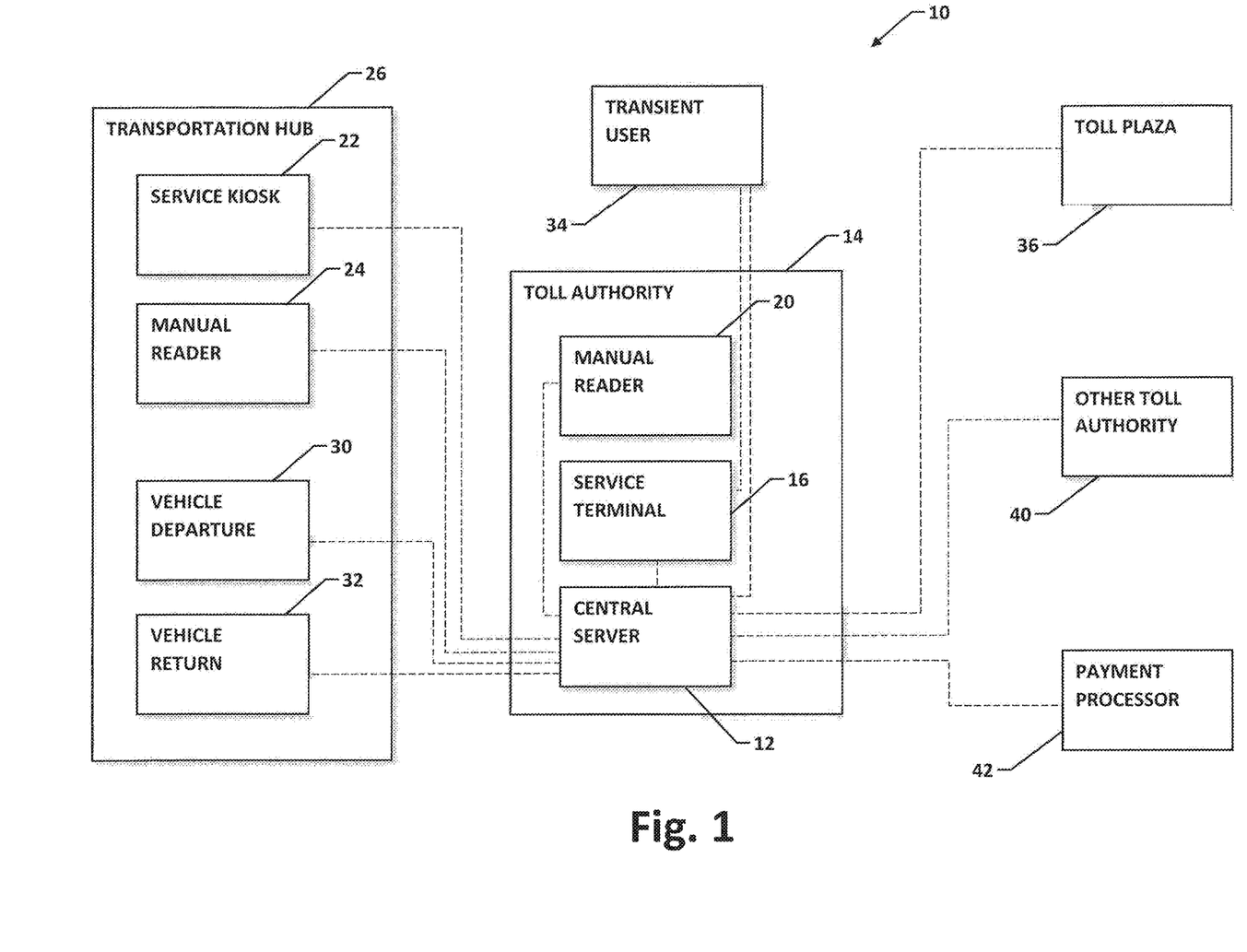
FIG. 1 is a schematic overview of a system for facilitating electronic toll payment for transient users, according to an embodiment of the present invention.

According to an embodiment of the present invention, a system 10 for facilitating electronic toll payment for transient users is implemented by a central server 12 associated with a toll authority 14. The central server 12 is in data communication with one or more service terminals 16 and manual radio frequency identification (RFID) transponder readers 20 associated with the toll authority 14. The central server 12 is also in data communication with one or more service kiosks 22 and manual RFID transponder readers 24 at a transportation hub 26, as well as with sensor units at vehicle departure and return points 30, 32 of the transportation hub 26.

The central server 12 and/or service terminal(s) 20 are additionally in data communication with smart phones or other personal electronic devices carried by one or more transient users 34. The central server 12 is also in data communication with sensor units at one or more toll plazas 36 operated by the toll authority 14, as well as with electronic toll systems operated by one or more other toll authorities 40 and with one or more payment processors 42.

The central server 12 includes one or more microprocessors and machine-readable memory configured with program instructions to execute the system 10 functions described in greater detail below. The server 12 is not limited to any particular type of microprocessor-based computer, nor does the term "server" necessarily imply that the server hardware is all in one location. For instance, various server functions could be distributed across a network of several machines, including machines executing other system functions.

The central server 12 can be directly or indirectly in data communication with the other elements of the system 10 via any suitable means. For example, the central server 12 and service terminal(s) 16 could be connected via local area network (LAN), with the manual reader(s) 20 communicating directly with one or more of the service terminals 16. Communication with system 10 elements at the transportation hub 26 could utilize the Internet or other wide area network, as could data communications with the transient user 34, toll plazas 36, other toll authorities 40 and payment processors 42.

The service terminal(s) 16 and service kiosk(s) 22 are also not limited to any particular type of microprocessor-based device. Desktop computers, laptop computers and tablet computers are a few non-limiting examples. Service kiosks 22 could be staffed and/or operated directly by the transient users 34.

The manual readers 20, 24 should be of type suitable for use with the RFID transponders to be distributed. Rather than using the manual readers 20, 24 to scan transponders, a code could be printed on transponders which the central server 12 could use to determine the associated unique identifiers after being scanned or manually input at the service kiosks 22 or service terminals 16. The present invention is not limited to a particular type of RFID transponder, although a passive RFID transponder integrated into a card suitable for hanging on a vehicle rearview mirror is believed to be a preferred embodiment.

The system 10 is not limited to use with any particular type or number of transportation hubs 26, though an airport with associated rental car providers is an advantageous example. The sensor units at the vehicle departure and return points 30, 32 preferably each include a suitable RFID reader and digital camera mounted on a gantry so as to be able to automatically read the RFID transponder and capture an image of the license plate as a rental vehicle passes by the gantry. The toll plazas 36 include similarly equipped sensor units. The unique identifier for each transponder read is communicated from these sensor units to the central server 12 along with the time and date of the reading.

License plate information can always be included with the communications to the central server 12 from the sensor units at the toll plazas 36 or included only in instances where no transponder is read from the vehicle passing the sensor unit. The license plate information can simply include the time- and date-stamped digital image, which is then analyzed with an optical character recognition (OCR) processing at the central server 12 to determine the license plate number and issuing authority. Alternately, the OCR processing could be conducted at the sensor unit, and the license plate and issuing authority transmitted to the central server 12.

The central server 12 receives toll usage data from other toll authorities 40 which have agreed to accept toll payments from vehicles equipped with transponders from the toll authority 14. The toll usage data from the other toll authorities 40 includes time- and date-stamped lists of unique transponder identifiers and/or license plate information which the central server 12 reconciles against its stored lists of active transponder identifiers and associated license plate information to determine whether to charge the corresponding user. Toll payments collected from such users are remitted to the other toll authorities 40. The payment processors 42 are banks or other business entities that process payments based on the payment information supplied by the transient users 34.

Figure 2:
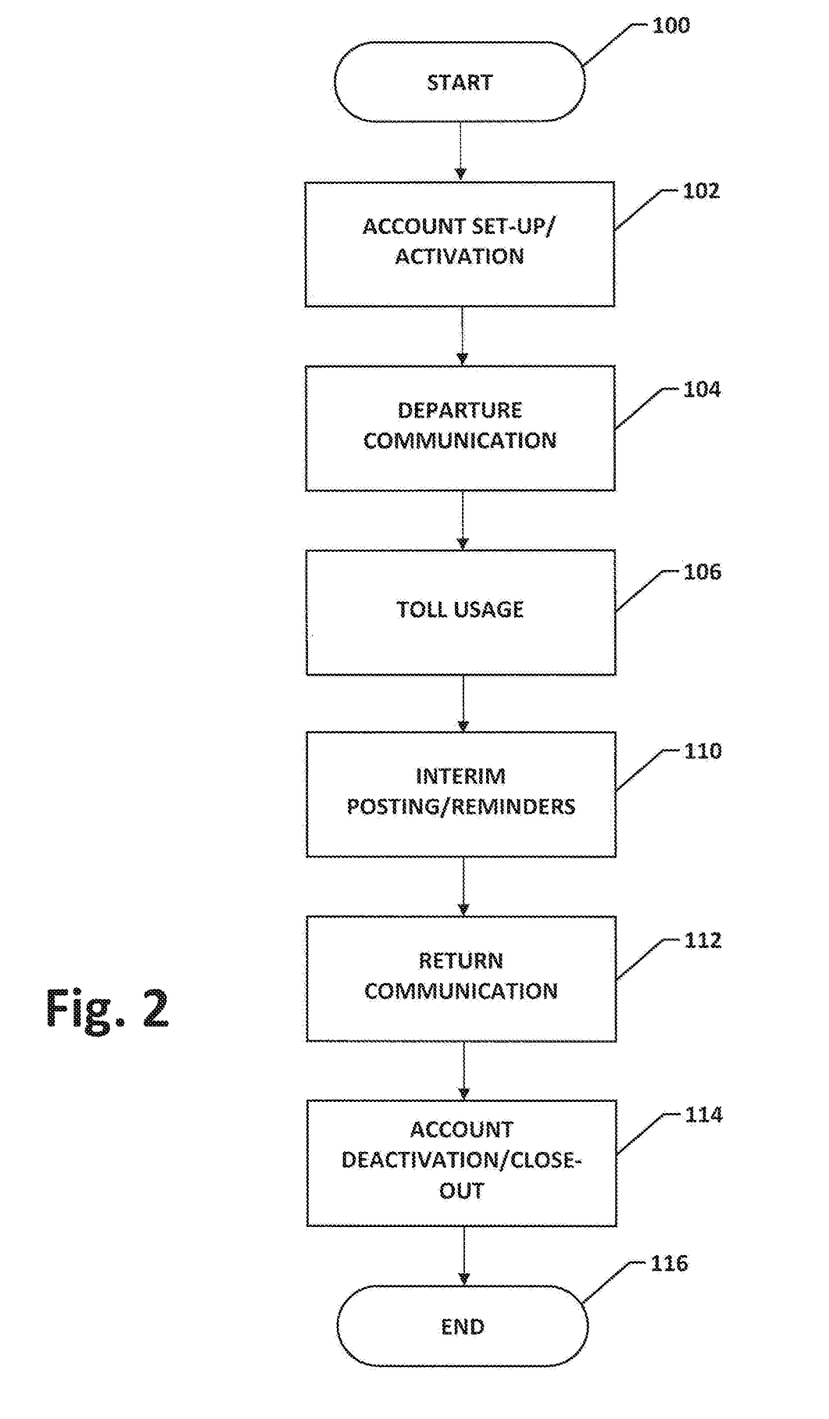
FIG. 2 is a flow diagram of a method executed by the system of FIG. 1.

Referring to FIG. 2, a method for facilitating electronic toll payment for transient users begins at 100. The method includes sub-routines for account set-up and activation at 102, departure communication at 104, toll usage at 106, interim posting and reminders at 110, return communication at 112, and account de-activation and close-out at 114 before ending at 116. It should be appreciated that the sub-routines and steps thereof can be performed in any logical order and repeated as necessary. Additionally, not every implementation of the method according the present invention will require the performance of every sub-routine or step that is described. Moreover, the division of the functions of the method into the described sub-routines is done for narrative purposes; the computer-implementation of the method does not necessarily require the coding divided specifically into these sub-routines.

Figure 3:
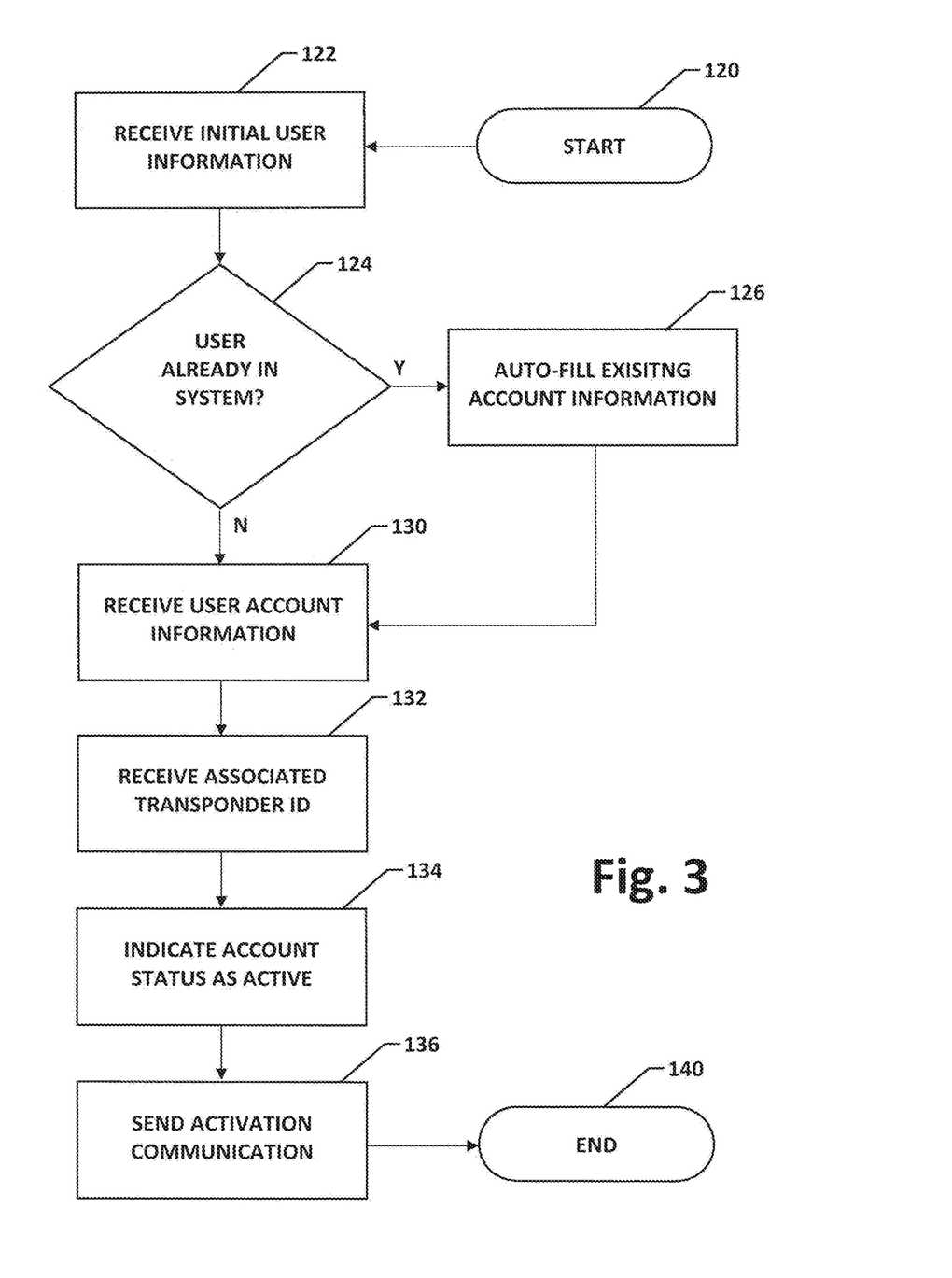
FIG. 3 is a flow diagram of an account activation routine of the method of FIG. 2.

Referring to FIG. 3, the account set-up and activation sub-routine 102 begins at 120. At 122, initial user information is received. For example, a user 34 could enter his name or other identifying information into a service kiosk 22 at the transportation hub 26, which communicates the information to the central server 12. At 124, the server 12 determines whether the user 34 is already in the system. For instance, the user 34 could have made an online reservation in advance, during which some or all user account information was captured, or account information for the user 34 could have been saved during a previous use of the system. If the user 34 is already in the system, the existing account information is auto-filled.

At 130, any remaining account information is received for an existing user 34 or complete account information is received for a new user 34. User account information preferably includes:

a user name;

user contact information, including a user phone number and/or email address;

estimated use duration; and user payment information, such as user credit card type, number and expiration date.

The server 12 receives the unique transponder identifier to be associated with the user account information at 132. For example, the user 34 receives a hang tag with a transponder and has it read by an RFID reader at the service kiosk 22, which communicates the identifier to the server 12. Alternately, a bar code or other visual identifier on the hang tag could be optically scanned at the service kiosk 22 and used to determine the associated transponder identifier. Likewise, printed characters located on the hang tag could be manually entered into the service kiosk 22.

Having received the user account information and associated transponder identification, the server 12 activates the account at 134. An activation communication is sent to the user 34 at 136. For example, the server 12 can automatically generate the activation communication and send it via the text or email using the contact information included in the user account information. The account activation and set-up subroutine 102 ends at 140.

Figure 4A:
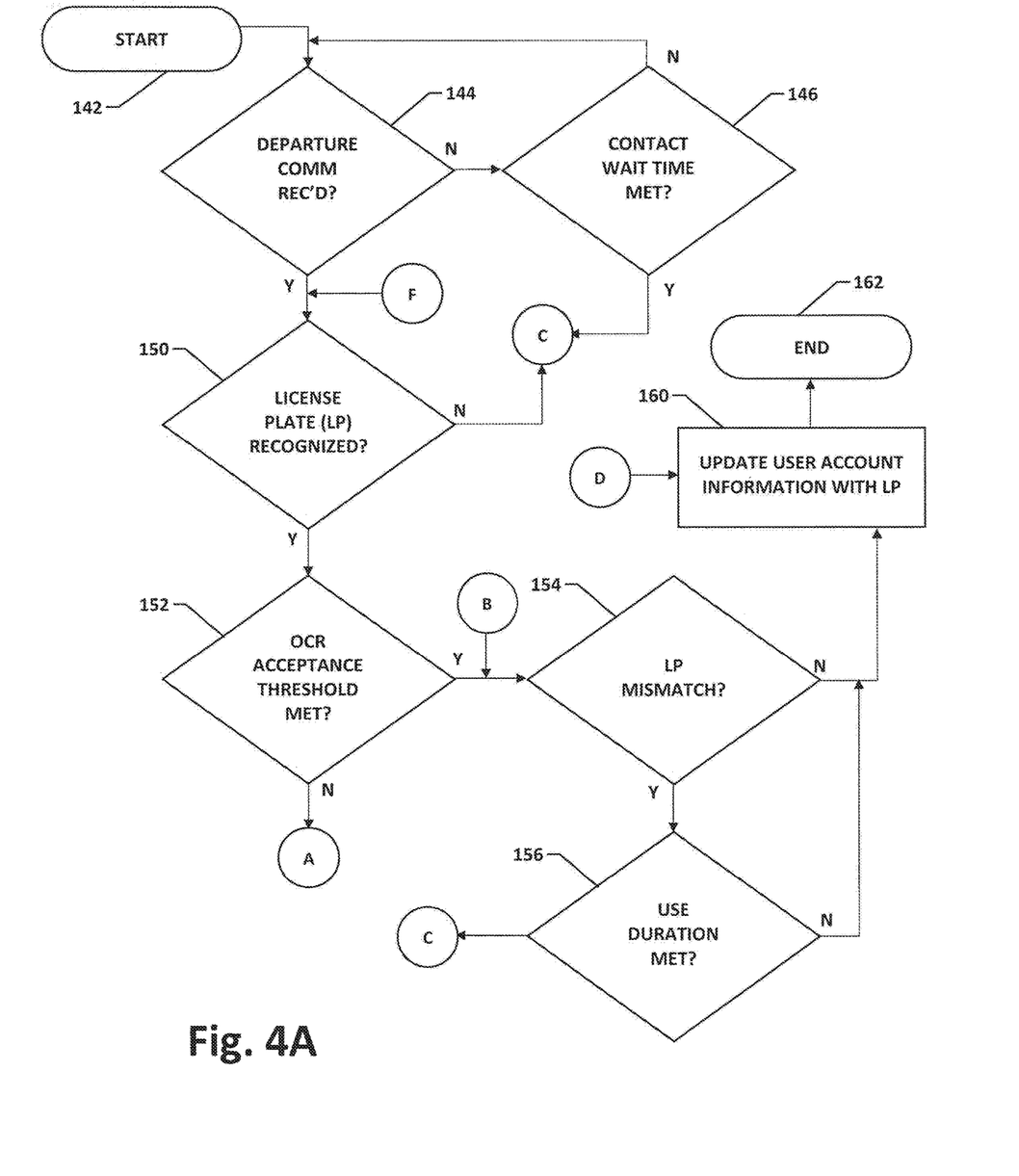
FIG. 4A is a flow diagram of a departure communication routine of the method of FIG. 2.
Figure 4B:
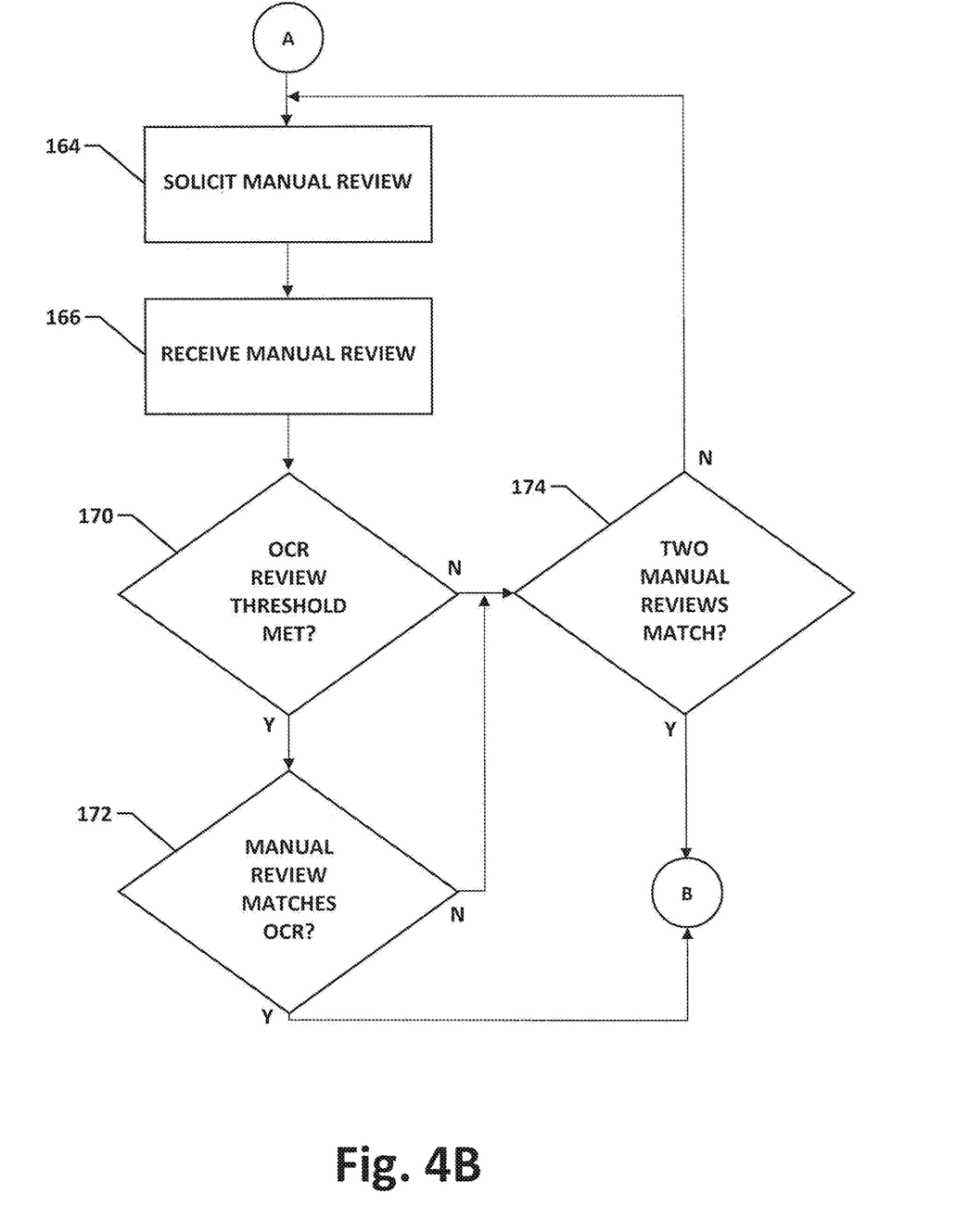
FIG. 4B is a flow diagram of an image review subroutine of the departure communication routine of FIG. 4A.
Figure 4C:
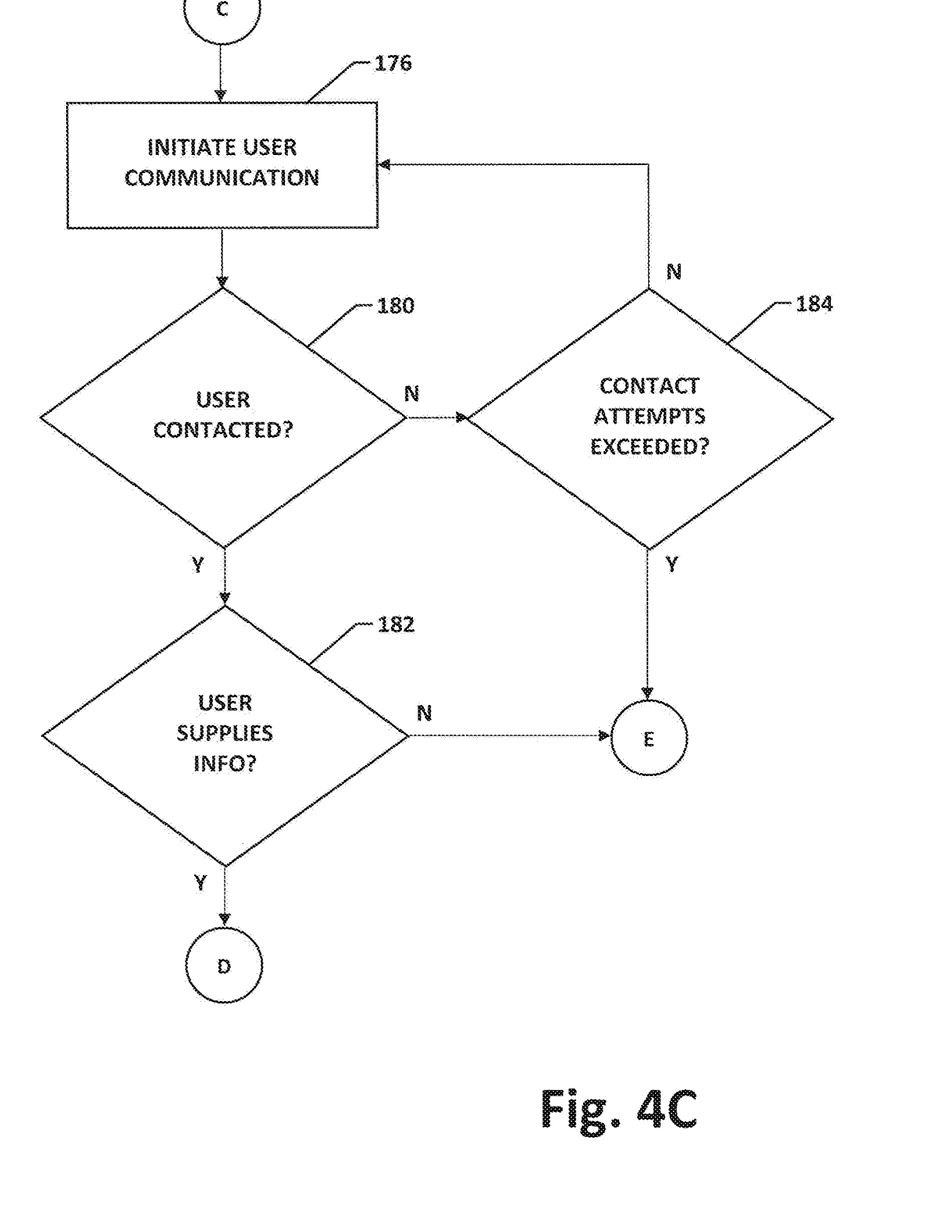
FIG. 4C is a flow diagram of a user contact subroutine of the departure communication routine of FIG. 4A.

Referring to FIGS. 4A-C, the departure communication subroutine 104 begins at 142. After the account status is set to active at 134 (see FIG. 3), the server 12 determines whether a departure communication has been received from the vehicle departure point 30 at 144. The server 12 will continue awaiting the departure communication if and until a predetermined wait time after account activation has been met (at 146).

Once a departure communication has been received at 144, the server 12 determines, at 150, whether OCR processing was able to recognize the necessary license plate information (typically, the alphanumeric license plate number and the issuing authority, such as the state government) of the rental vehicle. If the server 12 determines, at 152, that a confidence score assigned to the OCR processing results exceeds a predetermined threshold for acceptance, then the server 12 next determines (at 154) whether the recognized license plate information is a mismatch with license plate information already associated with the user account information.

As will be explained in greater detail below, this scenario might arise where a user 34 returns a rental vehicle to the vehicle return point 32 after an initial departure and then departs the departure point 30 again with the same or a different rental vehicle. Provided there is no mismatch, or if the server 12 determines (at 156) that the mismatched license plate information has been received within use duration included in the user account information, the server 12 updates the user account information with the license plate information at 160 and the departure communication subroutine 102 ends at 162.

If, at 152, the server 12 determines that the acceptance threshold was not met, then the server 12 solicits a manual review of the license plate image at 164; for instance, by sending a message or other notification to a reviewer at a service terminal 16. At 166 the server 12 receives the license plate information resulting from the manual review. The server 12 then determines, at 170, it the confidence score assigned to the OCR processing results is above a review threshold.

The review threshold is set at a level below the acceptance threshold and indicates that the OCR processing results are of sufficient quality to be used if matched by the results of at least one manual review. Hence, if the review threshold is met, then it is determined (at 172) whether the OCR processing results match the manual review results. If the OCR processing and manual review results match, then the subroutine 102 returns to the determination at 154 and continues as described using the matching results. If the OCR processing and manual review results do not match, or if the confidence score does not meet the review threshold, the server 12 determines if there is a match between two manual review results at 174.

If there is not a yet second or subsequent manual review result, or if no two manual review results match, then the subroutine returns to 164 and solicits another manual review. The subroutine 102 continues from 164 as described until there is match between a usable OCR process result and one manual review, or between two manual reviews. Once matching results are obtained at 172 or 174, the subroutine returns to the determination at 154 and continues as described using the matching results.

If the server 12 determines (at 146) that the wait time from account activation has been met without receipt of a departure communication, if the server 12 determines (at 150) that the no license plate was recognized in the departure communication from the vehicle departure point 30, or if the server 12 determines (at 156) that the use duration has met after determination of a license plate mismatch at 154, then the server 12 initiates a user communication at 176.

The user communication can be initiated by the server 12 notifying a customer service representative to contact the user 34 to obtain the needed information, providing the representative with the user contact information from the account information. Alternately, a user communication could be initiated automatically by the server to request the required information (e.g., via text and/or email). If a user contact attempt is determined to be successful (at 180), and the user 34 supplies the necessary information at 182 (i.e., license plate information and/or new estimated use duration), then subroutine 102 returns to 160, the user account information is updated accordingly and the subroutine 102 ends at 162.

If the user is determined not to have been contacted (at 180), then another user contact is initiated at 176 until the contact is successful, or until a predetermined number of contact attempts is determined to have been exceeded (at 184). If is determined that the user 34 declines to supply the needed information (at 182) or cannot be contacted after the predetermined number of attempts (at 186), then the server 12 moves from the account set-up and activation subroutine 102 to the account deactivation and close-out subroutine 114, as will be described in greater detail below.

Figure 5:
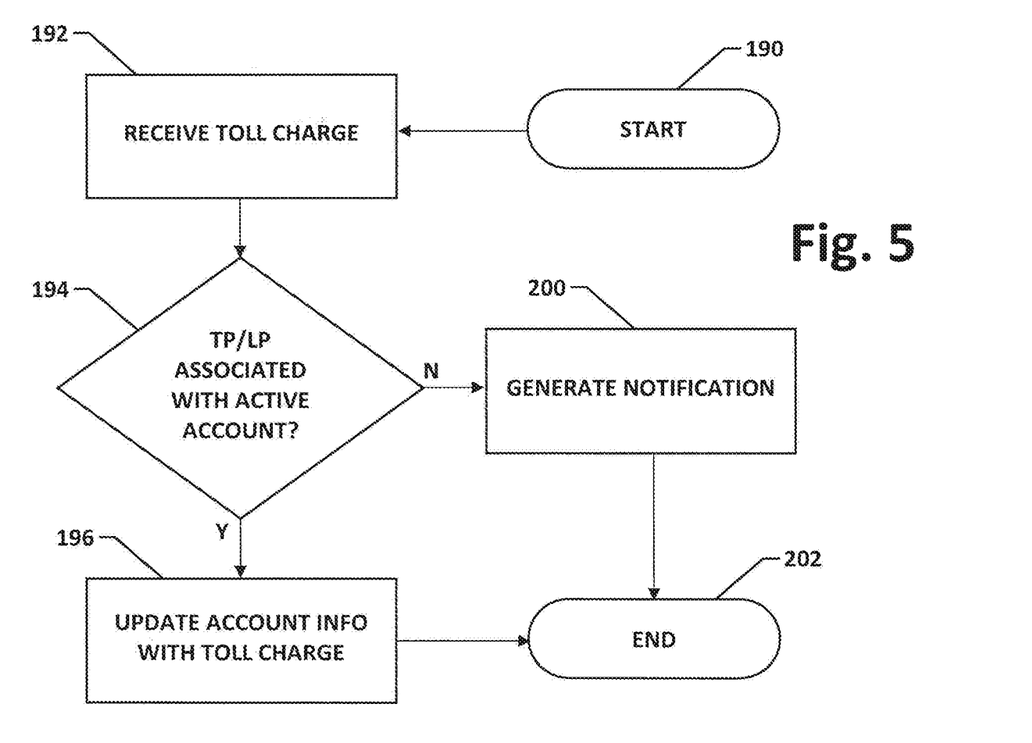
FIG. 5 is a toll usage routine of the method of FIG. 2.

With the user account status indicated as active and the user account information including the unique transponder identifier and associated license plate information for the rental vehicle, the toll usage subroutine 106 is fully enabled. Referring to FIG. 5, the subroutine 106 starts at 190, with a toll charge being received at 192. The toll charge will typically include the amount of the charge, as well as the location, date and time the toll was incurred. The toll charge can originate in various ways; for instance, with detection of the unique transponder identifier at a toll plaza 36 operated by the toll authority 14. If the toll plaza 36 RFID reader failed to read the transponder, the toll charge could originate with a captured image of the corresponding vehicle license plate. Alternately, the toll charge could originate another toll authority 40, either based on reading the unique transponder identifier or via capture of the license plate, following periodic toll reconciliations between the toll authority 14 and other toll authority according to existing procedures.

At 194, the server 12 determines whether the transponder identifier and/or license plate information corresponding to the toll charge is associated with an active user account. If so, the corresponding account is updated to include the toll charge at 196. If not, a suitable notification is generated at 200 or other appropriate procedure is initiated for a vehicle failing to pay a toll. In either case, the subroutine 106 ends at 202.

Figure 6:
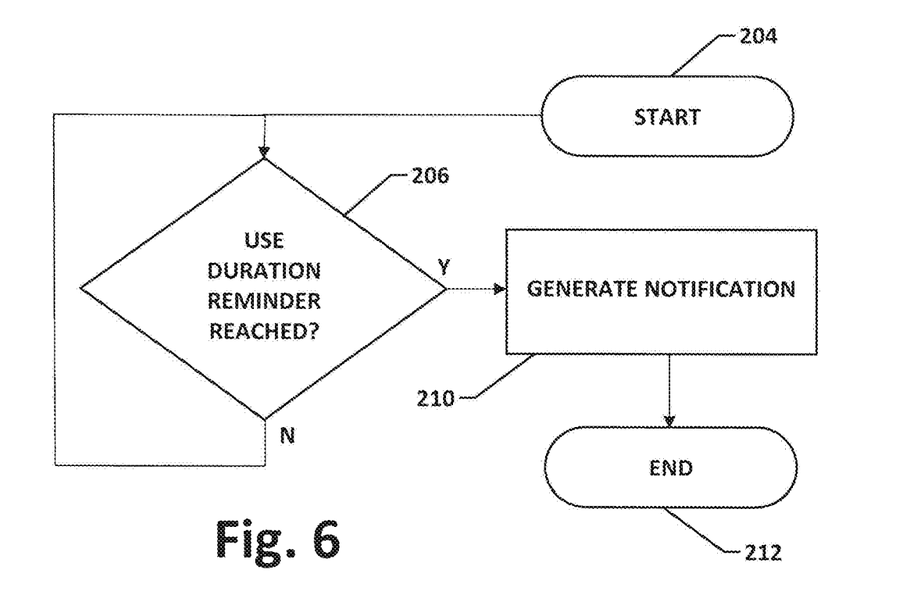
FIG. 6 is an interim reminder routine of the method of FIG. 2.
Figure 7:
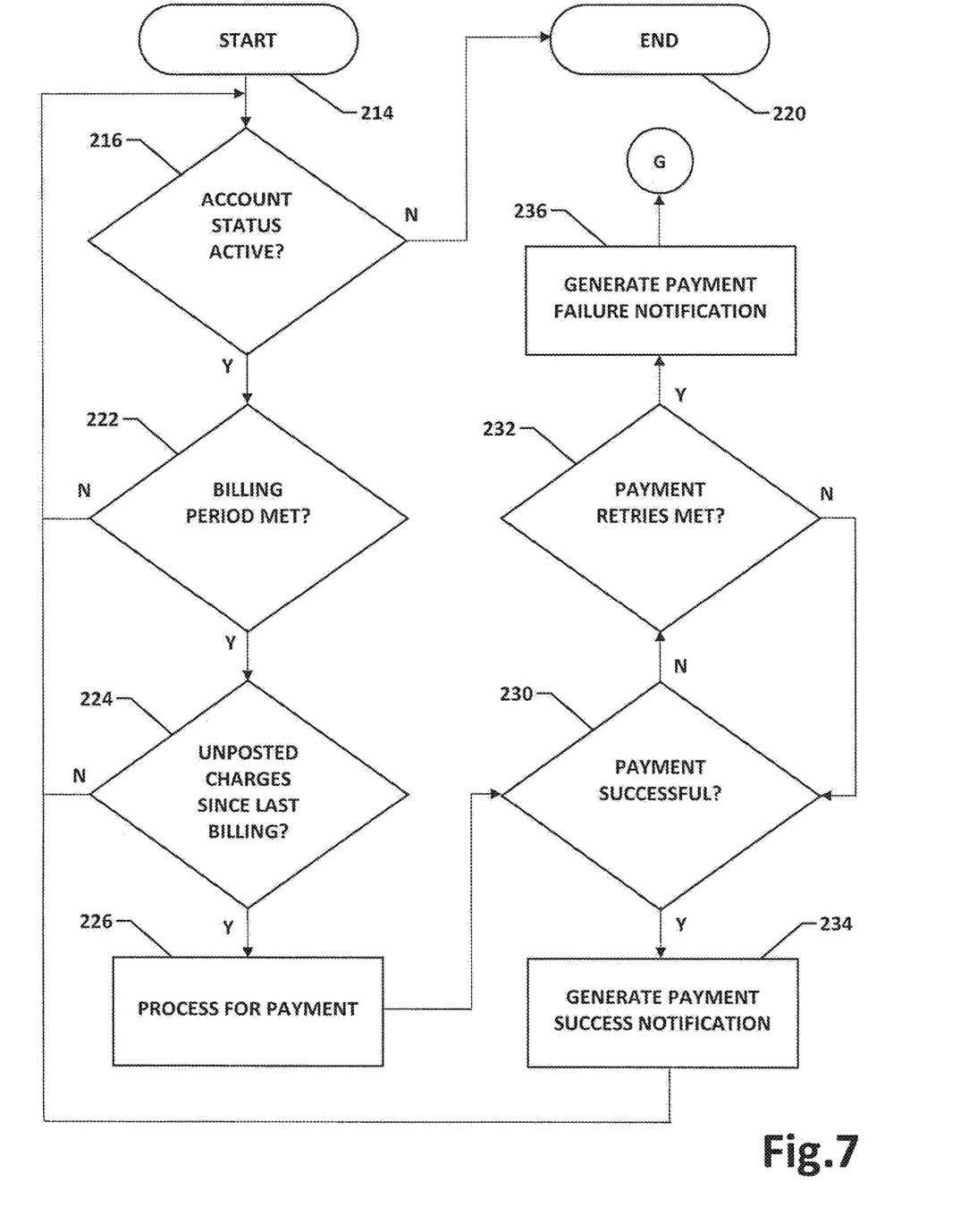
FIG. 7 is an interim posting routine of the method of FIG. 2.

Besides toll usage, various other subroutines 110 can occur between account activation, and deactivation/close-out. Referring to FIG. 6, an end of use reminder subroutine begins at 204. At 206, the server 12 determines whether a use duration reminder period has been reached. For example, the system could be configured to send a reminder to the user 34 twenty-four hours before the estimated use duration has been reached. If the reminder period has been reached, then the server 12 generates the reminder notification at 210 and the interim reminder subroutine ends at 212. Otherwise, the server 12 repeats 206.

Where the use duration will be longer than a desired billing period of the toll authority 14, an interim positing subroutine (beginning at block 214) can be employed. At 216, the server 12 determines whether the user account status is active. If the account status is not active, then the subroutine ends at 220 and any applicable billing will be taken care as part of the account deactivation/close-out subroutine 114. Provided the account remains active, the server 12 determines (at 222) whether the interim billing period (e.g., thirty days or one month) has been met. If the interim billing period has not been met, then the subroutine returns to 216.

If, at 222, the server 12 determines that the interim billing period has been met, then the server 12 determines (at 224) whether there are any unposted charges since any previous billing. If there are not, then the subroutine returns to 216 and repeats until the account is no longer active or the interim billing period is again met. If there are unposted charges at 224, then the server 12 processes any such charges for payment at 226 using the payment information supplied by the user 34. For instance, the server 12 automatically presents the charges for payment to the payment processor 42 corresponding to the user payment information.

If the payment is determined to be successful at 230, either initially or within a predetermined number of retries (at 232), a payment success notification is generated at 234. For instance, the server 12 can automatically send an appropriate email or text using the user contact information. The subroutine then returns to 216 and repeats until the account is no longer active or the interim billing period is again met. If payment is not successful (at 230) and the predetermined number of retries has been met (at 232), then a payment failure notification is generated at 236 and the server 12 transitions to a portion of the account deactivation and close-out subroutine 114, as will be described in greater detail below.

There are various ways in which the server 12 can be prompted to transition into the account deactivation and close-out subroutine 114. As noted previously, this can occur prematurely in instances in which the user 34 cannot be contacted or will not supply either missing information in connection with a departure communication or valid payment information in connection with an unsuccessful interim billing. The server 12 will also transition to the subroutine 114 based on one or more indications that the user 34 is no longer using the transponder.

Figure 8A:
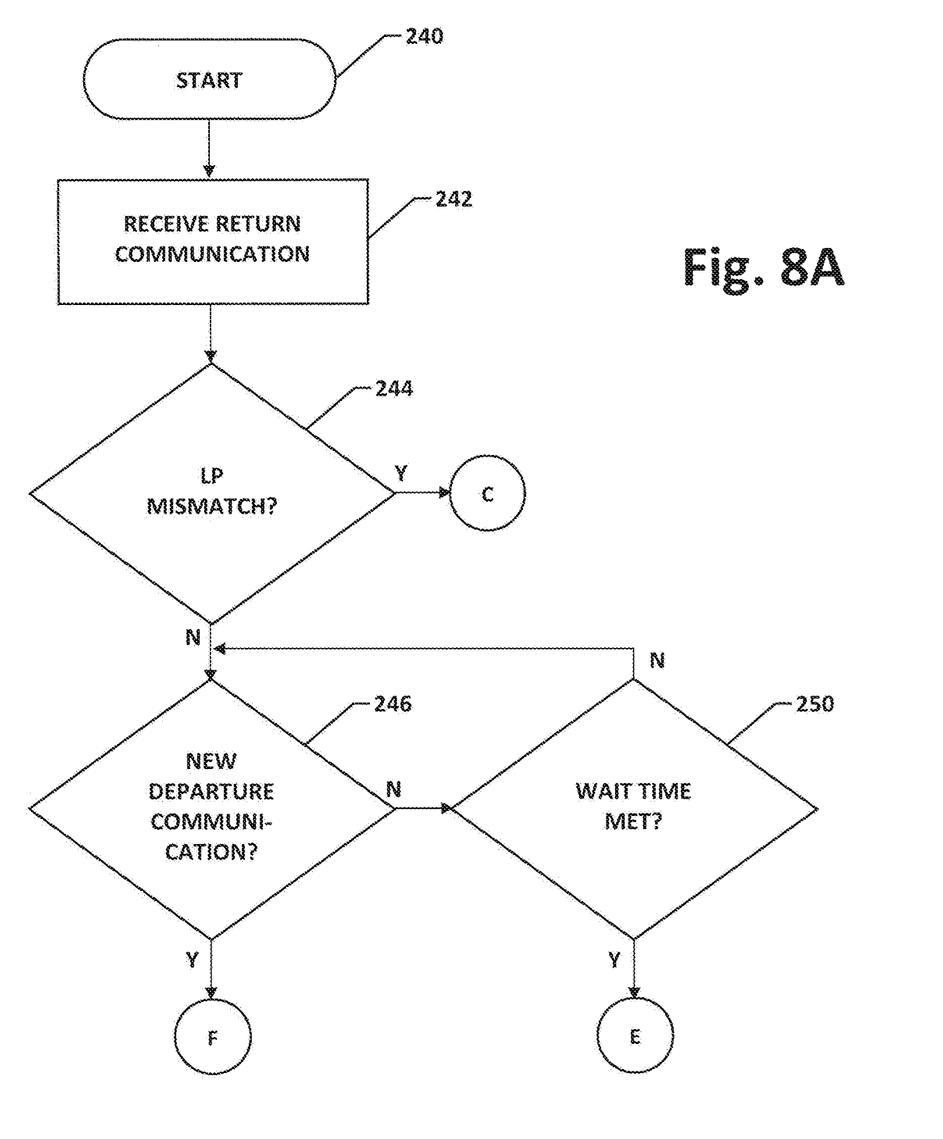
FIGS. 8A-8C are alternate executions of a return communication routine of the method of FIG. 2.

Referring to FIG. 8A, an embodiment of the return communication subroutine 112 associated with the user returning the vehicle to a return point 32 having a sensor unit begins at 240. The server 12 receives a return communication at 242 from the sensor unit at the vehicle return point 32. The return communication, like the departure communication, preferably is generated by reading the transponder and/or capturing and recognizing an image of the rental vehicle license plate.

At 244, the server 12 determines whether the license plate information in the return communication matches the license plate information currently in the user account information. If there is a mismatch, then a user communication is initiated as at 176 and then account information is updated based on user-supplied information, or the server 12 transitions to the account deactivation and close-out subroutine 114, as previously described above in connection with FIG. 4C. If there is not a mismatch, then the server 12 determines (at 246) whether a new departure communication has been received corresponding to the same user account—until such communication is received or the server 12 determines that a predetermined wait time has been met (at 250).

If a new departure communication is received at 246 within the predetermined wait time, then the server 12 returns to the departure communication subroutine 104 at 150, which continues as described above in connection with FIG. 4A. If the wait time is met at 250 without receipt of a new departure communication, the server 12 transitions to the account deactivation and close-out subroutine 114.

Figures 8B, 8C:
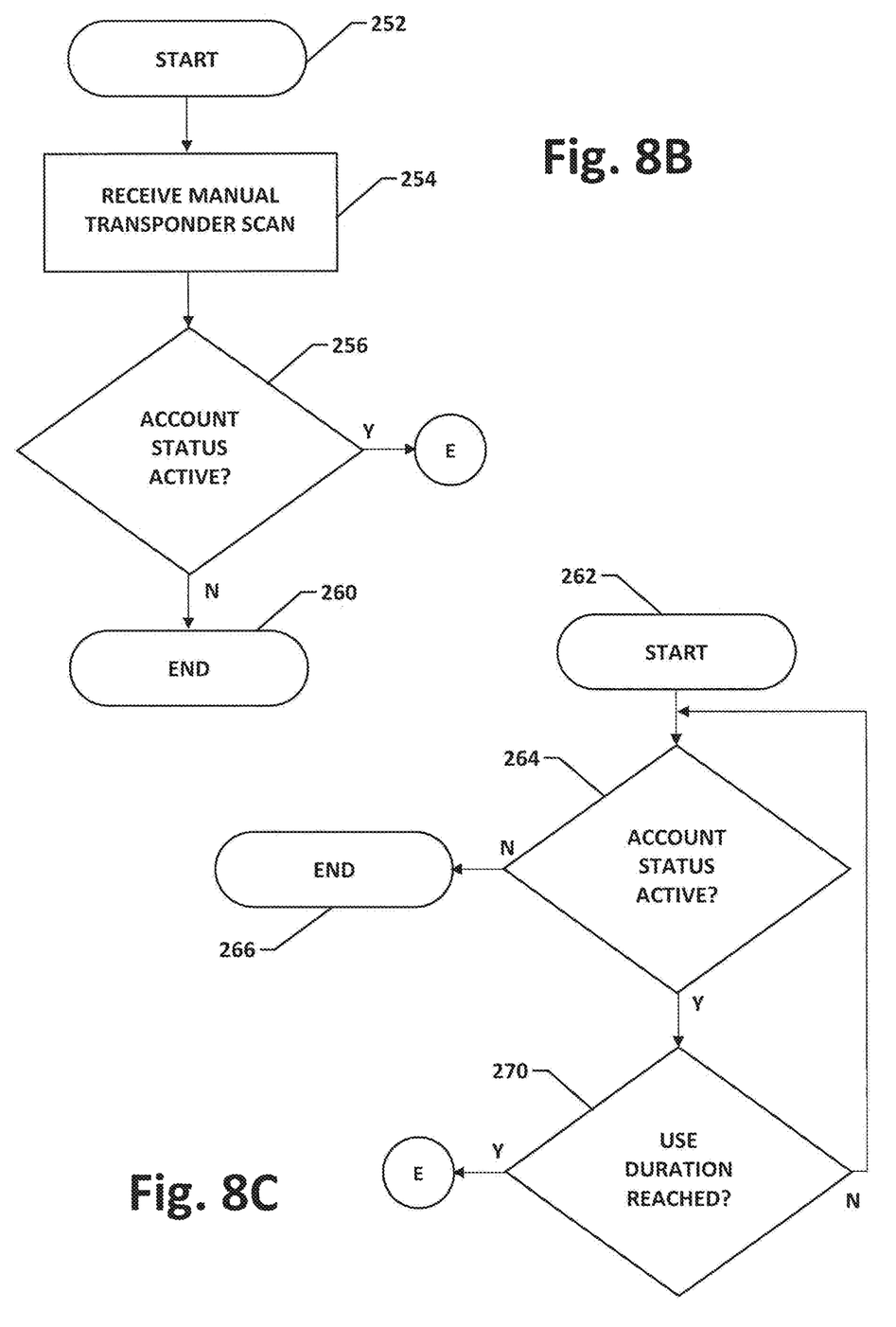

It will sometimes happen that there is no return communication received from the vehicle return point 32, although the user 34 has returned the rented vehicle. For instance, the user 34 might return the vehicle to some other return point that does not have a sensor unit for reading transponders, or the sensor unit at the return point 32 may simply fail to read the transponder or capture an adequate image of the vehicle license plate. If the user 34 returns the transponder—either in person at the transportation hub 26 or via mail (e.g., to the toll authority 14)— then service personnel can manually read via one of the manual scanners 20, 24, or otherwise enter the transponder identifier, which is communicated to the central server 12 along with a corresponding date and time of return.

Referring to FIG. 8B, a transponder return communication subroutine begins at 252. At 254, the server 12 receives the data from the manual transponder scan and determines whether the corresponding user account is still active at 256. If the account is no longer active, receipt of the returned transponder data is still used by the server 12, as will be seen below. In this case, this subroutine ends at 260. If the account is still active, then the server 12 transitions to the account deactivation and close-out subroutine 114.

Referring to FIG. 8C, an end of use duration subroutine begins at 262, which allows the server 12 to accommodate scenarios in which there may neither be a return communication from a vehicle return point 32, nor a communication of a returned transponder. At 264, the server 12 determines whether the account status is still active. If the account status is no longer active, then the subroutine ends at 266. If the account status is active, then the server 12 determines (at 270) whether the use duration, which was provided with the user account information as described in connection with FIG. 3, has been reached. If the use duration has not been reached, the subroutine returns to 200. If the use duration has been reached, then the server 12 transitions to the account deactivation and close-out subroutine 114.

Figure 9A:
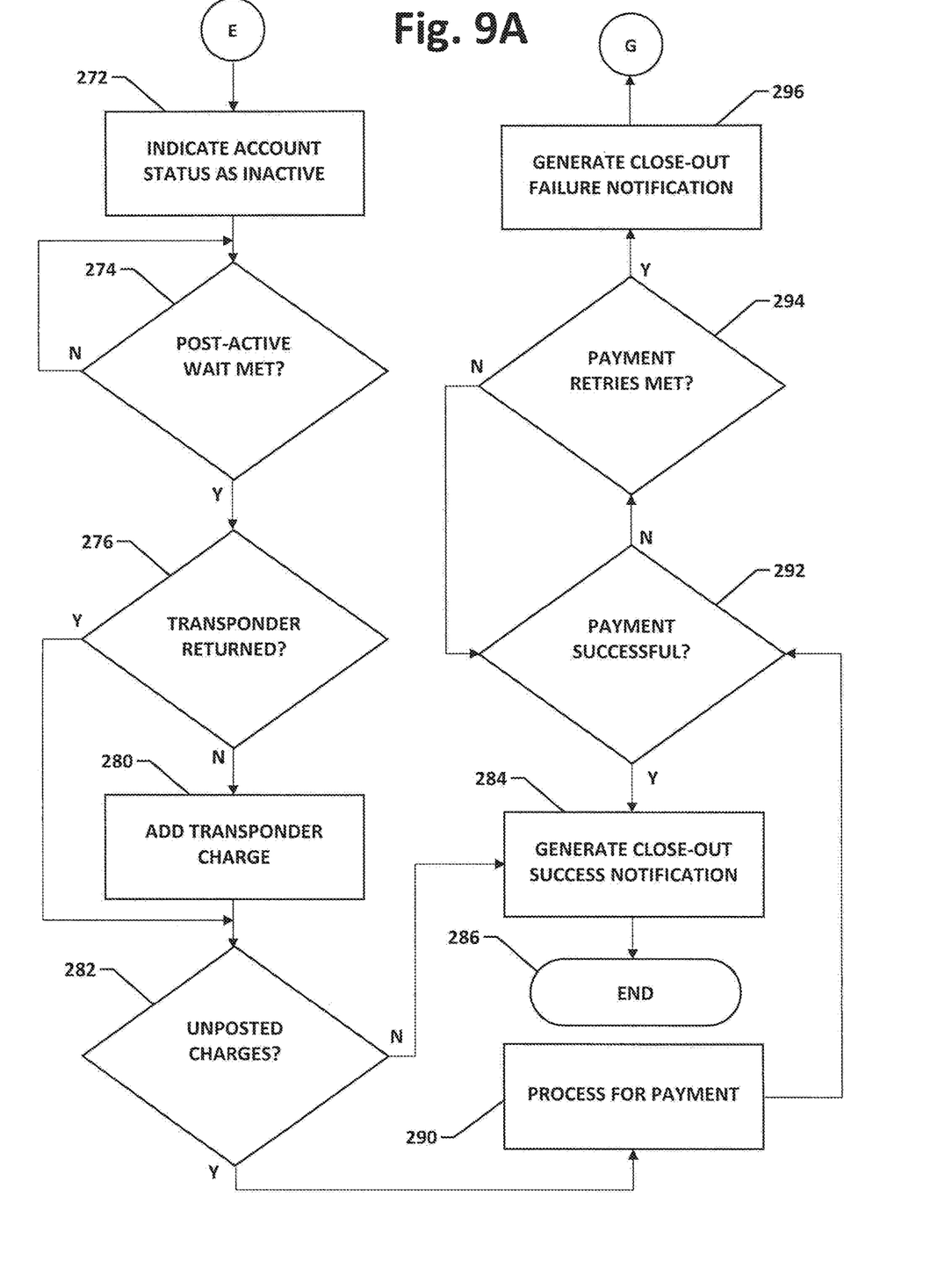
FIGS. 9A-9B are a flow diagram of an account deactivation and close-out routine of the method of FIG. 2.

Referring to FIG. 9A, the account deactivation and close-out subroutine 114, when entered from 182 or 184 (FIG. 4C), 250 (FIG. 8A), 256 (FIG. 8B) or 270 (FIG. 8C), begins with the server 12 indicating the account status as inactive at 272. The server 12 then determines (at 274) whether a predetermined wait time has met after the account becoming inactive. Once the wait time has been met, the server 12 determines (at 276) whether the transponder was returned (e.g., did the server receive the results of a transponder scan from 254 or via some other data entry mechanism). If the server 12 determines the transponder was not returned, then a transponder charge is added to the user account at 280.

In either case, the server 12 then determines whether there are unposted charges at 282 (i.e., since the beginning of the transient use or since the last successful interim billing, if any). If there are no unposted charges, the server 12 generates a close-out success notification at 284 (e.g., via text or email using the user contact information) and the subroutine ends at 286. If there are unposted charges, then server 12 processes any such charges for payment at 290. If payment is determined to be successful at 292, either immediately or within a predetermined number of retries (determined at 294), then the server 12 generates the close-out success notification at 284 and the subroutine ends at 286.

Figure 9B:
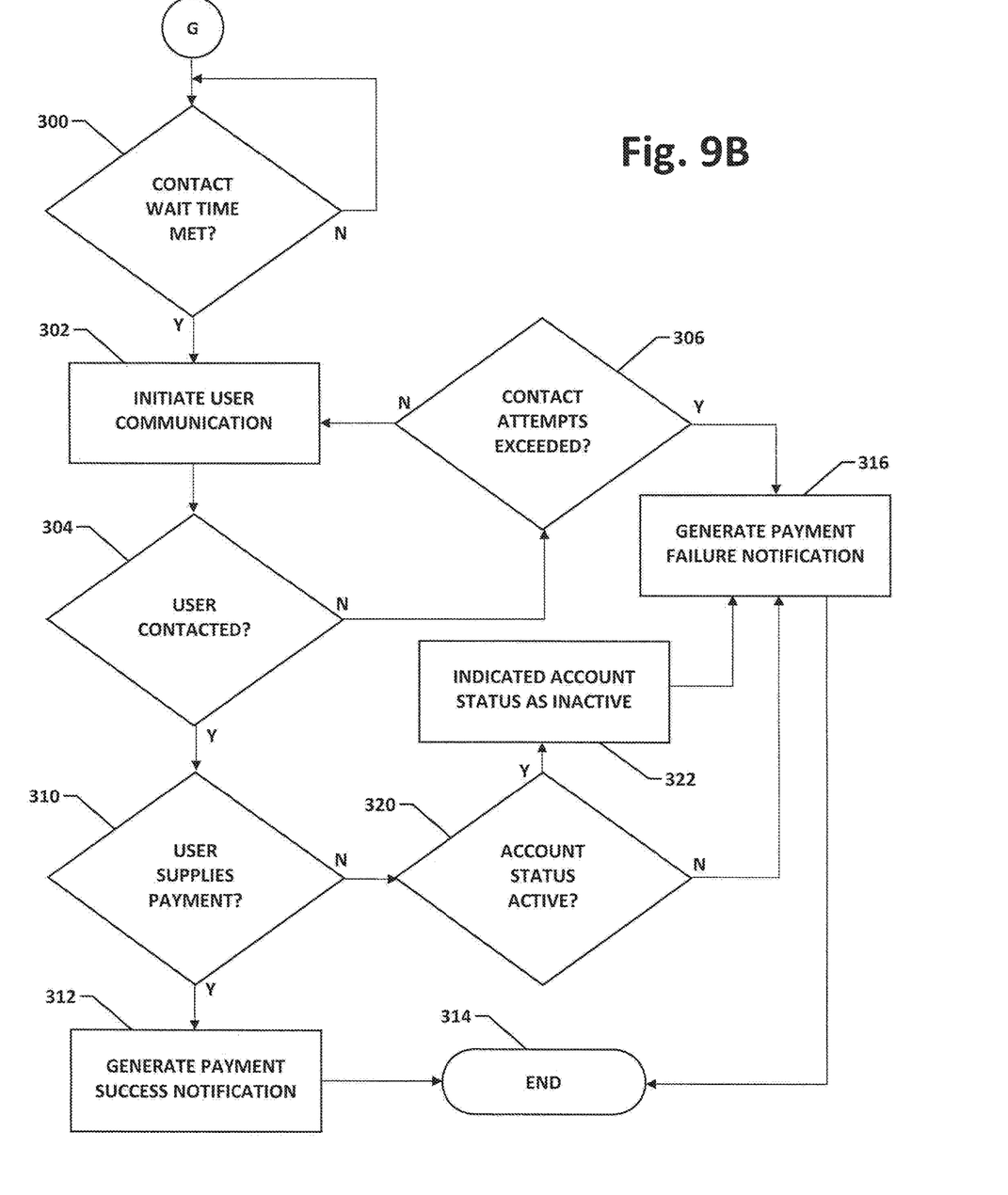

If payment is not successful within the predetermined number of retries, then the server 12 generates a close-out failure notification at 296. Referring to FIG. 9B, the subroutine then continues at 300 with the server 12 waiting a predetermined wait before initiating a user communication at 302. The interim billing subroutine of FIG. 7 also proceeds to 300 after generating the payment failure notification at 236. If the user can be contacted (determined at 304), either immediately or after a predetermined number of contact attempts (determined at 306), and the user supplies the necessary information for a successful payment (determined at 310), then a payment success notification is generated at the 312 and the subroutine ends at 314.

If the user does not supply information for a successful payment (at 310) or cannot be contacted within the predetermined number of attempts (at 306), then the server 12 generates a payment failure notification at 316 and the subroutine ends at 314. Subsequent collection action may be still taken with respect to the delinquent user, either within or outside the context of the system 10. If the server 12 comes to 300 from 236 in the interim billing routine, it is possible the account status will still be active. Consequently, after determining (at 310) that a user has not supplied payment, then the server 12 determines whether the account is still active at 320. If the account is still active, then the server 12 changes the account status to inactive at 322 before proceeding to generate the payment failure notification at 316.

From the foregoing, it will be appreciated that a system and method for tracking vehicle transponder use by transient users allows for reliable association of a transponder identifier with vehicle license plate information, in a manner that normally requires very little affirmative input from the transient user. The system and method also readily accommodate possible scenarios like the switching of vehicles by the same transient user, and the inability to read the transponder identifier and/or accurately capture vehicle license plate information at vehicle departure and return points.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A method for tracking vehicle toll transponder use by transient users, the method comprising:

receiving, at a server, account information for a transient user account, the account information including at least a unique transient user identifier;

receiving, at the server, a unique transponder identifier associated with the unique transient user identifier;

updating, at the server, the account information to include the unique transponder identifier associated with the unique transient user identifier and to indicate an account status as active;

after updating the account information to include the unique transponder identifier, receiving, at the server, initial departure information including a vehicle license plate number and issuing authority;

updating, at the server, the account information to include the vehicle license plate number and issuing authority using the initial departure information;

receiving, at the server, toll usage information indicating incurrence of a toll charge at a specified charge time and date associated with at least one of:
  the unique transponder identifier included in the account information; and
  the vehicle license plate number and issuing authority included in the account information; and updating, at the server, the account information to include the toll charge based on the toll usage information if the account information indicates the account status as active at the specified charge time and date;

wherein receiving the initial departure information includes receiving an initial departure communication from a sensor unit at a vehicle departure point, the initial departure communication including the unique transponder identifier and vehicle license plate data as detected by the sensor unit.

2. The method of claim 1, wherein the unique transient user identifier includes at least one of a user name and a user account number.

3. The method of claim 1, wherein the vehicle license plate data includes an image file of a vehicle license plate and receiving the first departure communication further includes performing an optical character recognition process on the image file to determine the vehicle license plate number and issuing authority.

4. The method of claim 3, wherein performing the optical character recognition process on the image file to determine the vehicle license plate number and issuing authority includes:

assigning a confidence score to an optical character recognition result; and if the confidence score satisfies a predetermined acceptance threshold, performing a review of the image file and updating the license plate number and issuing authority based on the outcome of the review.

5. The method of claim 4, wherein performing the review of the image file includes:

automatically soliciting an initial manual review of the image file;

receiving an initial manual review result;

if the confidence score satisfies a predetermined review threshold, comparing the initial manual review result with the optical character recognition result;

if the confidence score does not satisfy the predetermined review threshold, or if the initial manual review result and the optical character recognition result are compared but do not match, automatically soliciting at least one subsequent manual review of the image file, receiving the at least one subsequent manual review result and comparing the at least one subsequent manual review result with all previously compared results; and
once at least two compared results match, automatically updating the license plate number and issuing authority using the at least two matching results.

6. The method of claim 1, wherein receiving the account information further includes receiving user contact information, the user contact information including at least one of a user email address and a user phone number.

7. The method of claim 6, further comprising:
receiving, at the server, subsequent departure information including a subsequent vehicle license plate number and issuing authority; and
reconciling, at the server, the subsequent departure information with the initial departure information.

8. The method of claim 7, wherein reconciling the subsequent departure information with the initial departure information includes:
comparing the vehicle license plate number and issuing authority with the subsequent vehicle license plate number and issuing authority;
if the vehicle license plate number and issuing authority do not match the subsequent vehicle license plate number and issuing authority, determining whether to update the account information with the subsequent vehicle license plate number and issuing authority.

9. The method of claim 8, wherein receiving the account information further includes receiving a transient use duration and determining whether to update the account information with the subsequent vehicle license plate number and issuing authority includes:
if the transient use duration has not been reached, updating the account information with the subsequent vehicle license plate number and issuing authority; and
if the transient use duration has been reached, initiating a user communication with the user contact information, receiving a result of the user communication at the server, and updating the account information based on the received result.

10. The method of claim 1, further comprising:
receiving, at the server, initial return information including the unique transponder identifier included in the account information; and
determining, at the server, whether to update the account information to indicate the account status as inactive.

11. The method of claim 10, wherein, if receiving the initial return information includes receiving an initial return communication from a sensor unit at a vehicle return point, the initial return communication including the unique transponder identifier and return vehicle license plate data, then determining whether to update the account information includes:
determining whether a predetermined time period has passed after receiving the initial return communication without receiving, at the server, a subsequent departure communication from a sensor unit at a vehicle departure point including the unique transponder identifier; and
if the predetermined time period has passed without receiving the subsequent departure communication, updating the account information to indicate the account status as inactive.

12. The method of claim 11, wherein receiving the account information further includes receiving user contact information, the user contact information including at least one of an email address and a user phone number; and wherein, if the subsequent departure communication is received within the predetermined time period, then determining whether to update the account information further includes:
comparing a subsequent vehicle license plate number and issuing authority from the subsequent departure communication with the vehicle license plate number and issuing authority included in the account information;
if the vehicle license plate number and issuing authority match the subsequent vehicle license plate number and issuing authority, then maintaining the account status as active; and
if the vehicle license plate number and issuing authority do not match the subsequent vehicle license plate number and issuing authority, then initiating a user communication using the user contact information, receiving a result of the user communication, and determining whether to update the account information to indicate the account status as inactive based on the received result.

13. The method of claim 10, wherein, if receiving the initial return information includes receiving an initial return communication from a sensor unit at a manual transponder scan point, then the account information is updated to indicate the account status as inactive.

14. The method of claim 1, wherein receiving the account information further includes receiving a transient use duration; and
wherein the method further comprises:
determining, at the server, whether the transient use duration has been reached; and
if the transient use duration has been reached, updating the account information to indicate the account status as inactive.

15. The method of claim 14, wherein receiving the account information further includes receiving user contact information, the user contact information including at least one of a user email address and a user phone number; and
wherein the method further comprises:
determining, at the server, whether a predetermined reminder period prior to the transient use duration has been reached; and
if the predetermined reminder period has been reached, then initiating a user reminder communication with the user contact information.

16. The method of claim 1, wherein the account information includes user payment information; and
wherein the method further comprises:
updating, at the server, the account information to indicate the account status as inactive;
determining, at the server, whether a predetermined waiting period after the account status was indicated as inactive has been reached; and
if the predetermined waiting period has been reached, then initiating, at the server, a user charge with the user payment information.

17. The method of claim 16, further comprising:
determining, at the server, whether a predetermined activity period has been reached with the account status indicated as active; and
if the predetermined activity period has been reached, then initiating, at the server, a user charge with the user payment information.

18. A method for tracking vehicle toll transponder use by transient users, the method comprising:

receiving, at a server, account information for a transient user account, the account information including at least a unique transient user identifier;

receiving, at the server, a unique transponder identifier associated with the unique transient user identifier;

updating, at the server, the account information to include the unique transponder identifier associated with the unique transient user identifier and to indicate an account status as active;

after updating the account information to include the unique transponder identifier, receiving, at the server, initial departure information including a vehicle license plate number and issuing authority;

updating, at the server, the account information to include the vehicle license plate number and issuing authority using the initial departure information;

receiving, at the server, toll usage information indicating incurrence of a toll charge at a specified charge time and date associated with at least one of:
- the unique transponder identifier included in the account information; and
- the vehicle license plate number and issuing authority included in the account information; and updating, at the server, the account information to include the toll charge based on the toll usage information if the account information indicates the account status as active at the specified charge time and date;

wherein receiving the account information further includes receiving user contact information, the user contact information including at least one of a user email address and a user phone number; and wherein receiving the initial departure information includes:
- receiving an initial departure communication from a sensor unit at a vehicle departure point, the initial departure communication including the unique transponder identifier as detected by the sensor unit without vehicle license plate data;
- initiating a user communication with the user contact information; and
- receiving, at the server, the license plate number determined from the user communication.

19. A method for tracking vehicle toll transponder use by transient users, the method comprising:

receiving, at a server, account information for a transient user account, the account information including at least a unique transient user identifier;

receiving, at the server, a unique transponder identifier associated with the unique transient user identifier;

updating, at the server, the account information to include the unique transponder identifier associated with the unique transient user identifier and to indicate an account status as active;

after updating the account information to include the unique transponder identifier, receiving, at the server, initial departure information including a vehicle license plate number and issuing authority;

updating, at the server, the account information to include the vehicle license plate number and issuing authority using the initial departure information;

receiving, at the server, toll usage information indicating incurrence of a toll charge at a specified charge time and date associated with at least one of:
- the unique transponder identifier included in the account information; and
- the vehicle license plate number and issuing authority included in the account information; and updating, at the server, the account information to include the toll charge based on the toll usage information if the account information indicates the account status as active at the specified charge time and date;

wherein receiving the account information further includes receiving user contact information, the user contact information including at least one of a user email address and a user phone number; and wherein receiving the initial departure information includes:
- after a predetermined time period has passed following receiving the unique transponder identifier associated with the unique transient user identifier without subsequently receiving an initial departure communication from a sensor unit at a vehicle departure point, initiating a user communication with the user contact information; and
- receiving, at the server, the license plate number determined from the user communication.

* * * * *